United States Patent [19]

Barry et al.

[11] Patent Number: 5,227,789
[45] Date of Patent: Jul. 13, 1993

[54] MODIFIED HUFFMAN ENCODE/DECODE SYSTEM WITH SIMPLIFIED DECODING FOR IMAGING SYSTEMS

[75] Inventors: Michael J. Barry; Paul W. Melnychuck, W. Henrietta; John A. Weldy, Rochester, all of N.Y.

[73] Assignee: Eastman Kodak Company, Rochester, N.Y.

[21] Appl. No.: 735,549

[22] Filed: Sep. 30, 1991

[51] Int. Cl.$^5$ .................. H03M 7/40; H03M 7/42
[52] U.S. Cl. ................................ 341/65; 341/106
[58] Field of Search ............... 341/65, 88, 106, 67, 341/50, 59

[56] References Cited

U.S. PATENT DOCUMENTS

| | | | |
|---|---|---|---|
| 3,883,847 | 5/1975 | Frank | 340/146.1 R |
| 4,044,347 | 8/1977 | Van Voorhis | 341/65 X |
| 4,488,143 | 12/1984 | Martin | 341/59 |
| 4,580,129 | 4/1986 | Bahgat | 341/67 |
| 4,969,204 | 11/1990 | Melnychuck et al. | 382/56 |

OTHER PUBLICATIONS

Michael Hankamer, "A Modified Huffman Procedure with Reduced Memory Requirement", *IEEE Transactions on Communications*, Jun. 1979, vol. Com-27, No. 6, pp. 930-932.

*Primary Examiner*—Sharon D. Logan
*Attorney, Agent, or Firm*—Edward Dugas

[57] ABSTRACT

The K most frequently occurring symbols in an image represented by an alphabet of N symbols are mapped to a set of K codewords. The length of each codeword is an inverse function of the frequency of occurrence of the corresponding symbol in the image and the longest codeword is of length d bits. The remaining N−K symbols are mapped in order of their magnitude to a set of supplementary codewords of a uniform maximum length D bits. The d most significant bits of each supplementary codeword form a prefix which is uniform within each set and specifies whether the corresponding symbol is positive or negative. The remaining or least significant D−d bits of each supplementary codeword comprise a suffix and are mapped in order of bit position to progressively more narrow ranges of symbol values of the remaining N−K symbols.

20 Claims, 8 Drawing Sheets

TABLE A
(8 BITS MAX)

| SYMBOL | CODE |
|---|---|
| 0 | 0 0 |
| 1 | 0 1 0 |
| 2 | 1 1 0 |
| 3 | 1 1 1 0 |
| 4 | 1 1 1 1 0 |
| 5 | 1 1 1 1 1 0 |
| 6 | 1 1 1 1 1 1 0 |
| 7 | 1 1 1 1 1 1 1 0 |
| ESCAPE | 1 1 1 1 1 1 1 1 |

FIG. 1A
(PRIOR ART)

TABLE B
(11 BITS MAX)

| SYMBOL | CODE |
|---|---|
| 8 | 1 1 1 1 1 1 1 1 1 1 1 |
| 9 | 1 1 1 1 1 1 1 1 1 1 0 |
| 10 | 1 1 1 1 1 1 1 1 1 0 1 |

FIG. 5
ENCODER

FIG. 6

FIG. 7
DECODER

FIG. 8

MODIFIED HUFFMAN ENCODE/DECODE SYSTEM WITH SIMPLIFIED DECODING FOR IMAGING SYSTEMS

BACKGROUND OF THE INVENTION

1. Technical Field

The present invention is related to a flexible encoding/decoding method for digital images using Huffman codes. More particularly, the invention relates to a method of encoding digital images with one maximum codeword length and decoding the encoded digital image with the same or a lesser maximum codeword length which may be selected as desired without regard to the maximum codeword length with which the encoding was performed.

2. Background Art

A digital image may be compressed without loss of information or image quality by encoding each of the symbols or pixel values representing the image in such a way as to reduce the total number of bits representing the digital image. If the digital image is to be recorded on media such as an optical disk, the compression permits more images to be recorded on a given disk and speeds up the playback process. To accomplish this, the symbols to be encoded are classified in accordance with their frequency of occurrence in the type of digital image being encoded. From this, a code table is constructed as follows: Each symbol is associated with a unique codeword whose length is an inverse function of the frequency of occurrence of the symbol in the digital image. Thus, the most frequently occurring symbol is encoded to the shortest codeword, a lesser frequently occurring symbol is encoded to a longer codeword and the least frequently occurring symbol is encoded to the longest codeword.

Figure 1A:
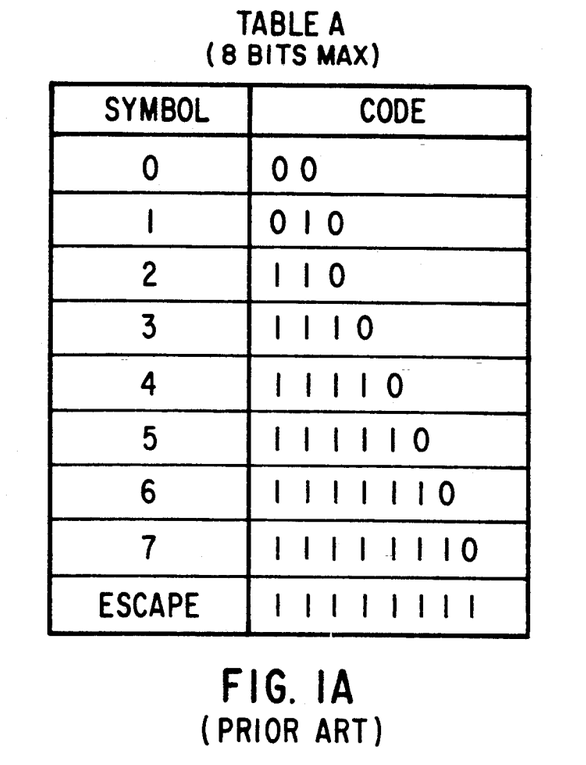
FIG. 1 illustrates a pair of modified Huffman encoding tables in accordance with prior art techniques.
Figure 1B:
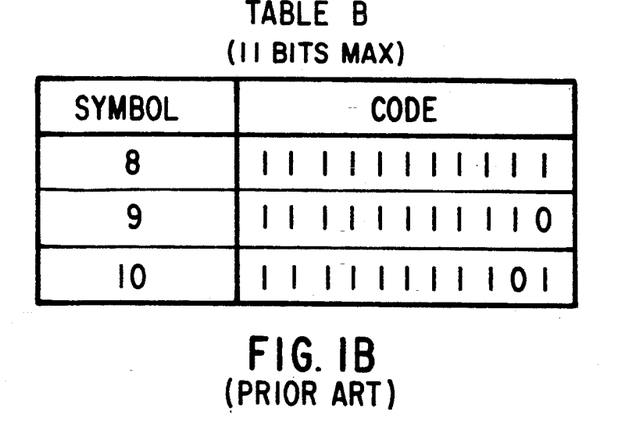

This method is particularly powerful if, prior to the above-described encoding process, the original image is first subjected to a conventional differencing process (such as delta modulation or differential pulse code modulation) which emphasizes differences among the image pixels. Since most images contain many repetitive pixels (e.g., a blue sky), the most frequently occurring symbol in the processed image is zero. In this exemplary encoding scheme, the symbol zero would be encoded to the shortest codeword. One example of a code table of this type is Table A of FIG. 1. In Table A, the symbols are listed in their order of frequency of occurrence, not necessarily in order of their magnitudes. Thus, the symbol labelled "0" is the most frequently occurring symbol (which in this case happens to be the symbol of zero value), the symbol labelled "1" is the next frequently occurring, and so forth. The maximum codeword length is 8 bits (i.e., the length of the last symbol in Table A). The more symbols to be decoded, the greater the maximum codeword length.

When the digital image is played back, a conventional decoder converts the codewords back into the appropriate symbols in accordance with the code table during playback. One problem that arises is that the speed at which the decoder operates and the complexity of the decoder is determined at least in part by the maximum codeword length. Limiting the maximum codeword length (e.g., to 8 bits as in Table A) limits the number of allowable symbols, requiring that the digital image pixels be quantized to a limited number of amplitude levels (one for each allowable symbol) which introduces quantization error into the digital image. To reduce such quantization error, the number of allowable symbols must be increased, by increasing the maximum codeword length in the code table, thereby increasing the complexity of the decoder and reducing its speed. The number of allowable symbols can also be increased by lengthening some of the symbols, which reduces the compression.

U.S. Pat. No. 3,883,847 to Frank discloses a method of decoding employing two code tables such as (for example) Tables A and B of FIG. 1. While Table A (maximum codeword length 8-bits) defines the codewords for the seven most frequently occurring symbols, Table B (codeword length 11-bits) defines the codewords for the three least frequent symbols. This permits the image to be quantized to ten quantization levels. Most of the time, the decoder operates as a decoder of maximum codeword length 8-bits. For a small fraction of the total time, the decoder must refer to Table B and operate as a decoder of maximum codeword length 11-bits, thereby incurring a relatively small penalty for the capability of handling three additional symbols. The last entry in Table A is the "ESCAPE" codeword having eight binary ones. Most of the time the decoder refers to Table A and in the rare instances that the decoder encounters the escape codeword, it knows that the codeword is 11 bits long and refers to Table B. A similar implementation of this type of technique is disclosed by Hankamer, "A Modified Huffman Procedure with Reduced Memory Requirement", *IEEE Transactions on Communications*, Vol. COM-27, No. 6, pp. 930-932 (June 1979).

Another decoding strategy involves the principle of converting the variable-length code to a fixed length code prior to symbol decoding. In U.S. Pat. No. 4,044,347 to VanVoorhis, each variable length codeword is converted to a fixed length integer, and then the integer is used to index a table of fixed-length characters. This technique has the advantage of a reduced memory requirement.

Even with the foregoing technique, a significant problem remains that the structure of the decoder is dictated by the structure of the encoder. The decoder must employ both Table A and Table B. One variation in the decoder structure may be to dispense with Table B and assign an arbitrary value to all escape codewords, ignoring the last three bits thereof. Thus, the decoder operates as a decoder of maximum codeword length either 11 bits or (in the variation suggested herein) 8 bits. No other variations are possible without modifying the code table.

This is a particularly significant disadvantage when the foregoing techniques are applied to recording photographic images on a compact disk (CD), as disclosed in U.S. Pat. No. 4,969,204 assigned to the present assignee. In this application, a hierarchy of different quality versions of the same image may be played back by CD players of different complexities and designs.

Figure 2:
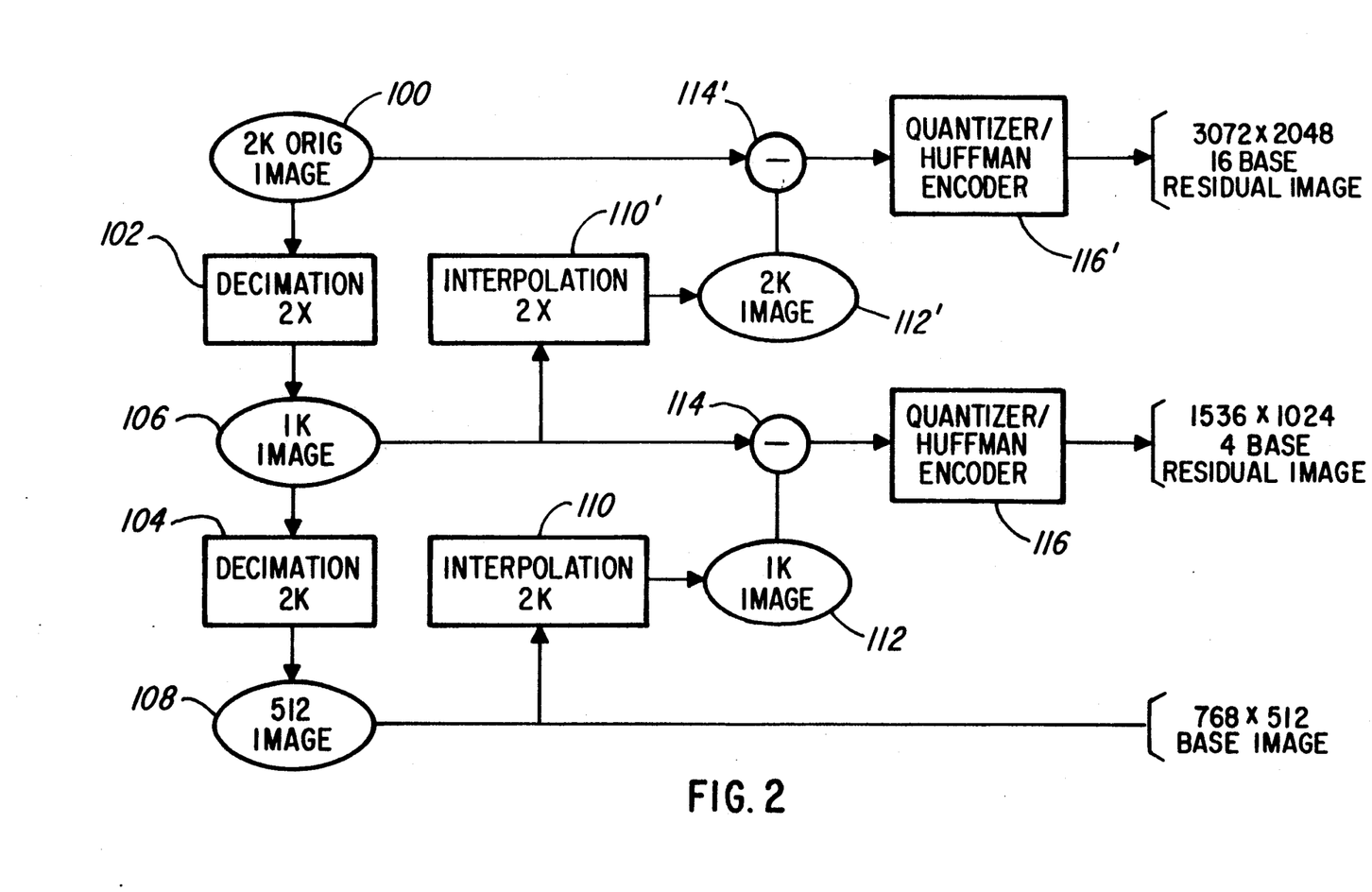
FIG. 2 illustrates a process for processing digital images prior to recording on a CD in accordance with the U.S. Patent referred to above.

The recording of an image in accordance with this hierarchy is illustrated in FIG. 2. An original image (100) having 2048 horizontal line resolution is decimated (sub-sampled) twice (102, 104) to produce versions of the same image having 1024 and 512 horizontal line resolution respectively (106, 108), the latter being recorded as the base image. The base image is interpolated (110) to a 1024 horizontal line image (112) which is subtracted (114) from the decimated 1024 line image in a differencing process of the type mentioned previously herein. The difference is then quantized and Huffman encoded (116) to produce a 1024 horizontal line residual ("4 Base") image which is recorded on the CD. A similar process illustrated in FIG. 2 (at 110', 112', 114' and 116') is employed to construct a 2048 line ("16 Base") residual image which is also recorded on the CD.

Figure 3:
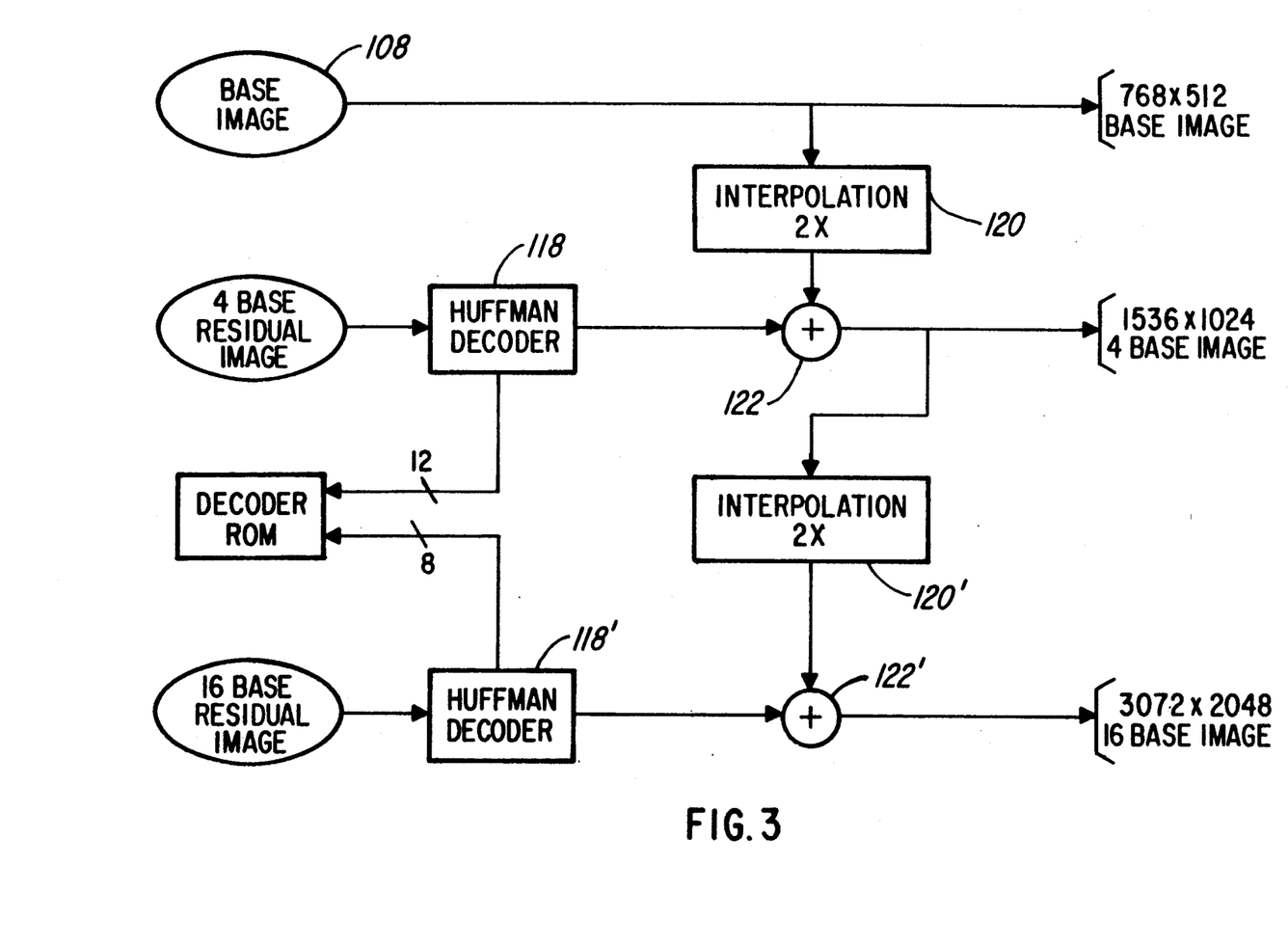
FIG. 3 illustrates the corresponding process for playing back and processing the images recorded in the process of FIG. 2.

The playback of an image in this hierarchy is illustrated in FIG. 3. The base image 108 may simply be played back without any enhancement. A higher resolution (1024 horizontal line) image is obtained, however, by Huffman decoding (118) the 4 Base image, interpolating (120) the base image and adding (122) them together. A similar process illustrated in FIG. 3 (at 118', 120' and 122') produces the highest quality (2048 horizontal line resolution) image using the Base image, the 4 Base residual image and the 16 Base residual image.

The foregoing hierarchy permits CD players of different complexities to play back the recorded image at different levels of image quality, satisfying different market demands. The problem, however, is that the decoder structure in all of the different CD players must be the same because the Huffman decoding processes 118 and 118' of FIG. 3 must be the precise reverse of the Huffman encoding processes 116 and 116' of FIG. 2. In the Huffman encode/decode example of FIG. 1, the only possible variation is that the more economical CD players may forego Table B and simply assign an arbitrary value to the ESCAPE codeword. This single variation fails to reflect the diverse variations of playback image quality permitted by the CD image recording/playback hierarchy of FIGS. 2 and 3. It also fails to reflect the need to fit CD player manufacturing costs within different narrow niches of various specific markets in which they are to be sold. For all practical purposes, the prior art allows no flexibility in the decoder structure and cost. It should be noted that the cost of the decoder is a fraction of the cost of the memory or ROM.

Therefore, it is an object of the invention to permit a wide range of design complexity and performance levels in the decoder design of the image CD player. Specifically, it is an object of the invention to permit the same recorded image to be played back with many different decoders operating with different maximum codeword lengths within a predetermined range.

DISCLOSURE OF THE INVENTION

The invention is a method of encoding and decoding a digital image in which the encoding is carried out with a code table characterized by a certain maximum codeword length, the method permitting the decoding of the encoded image to be carried out by any one of many different decoders characterized by different maximum codeword lengths.

Preferably, the digitized image is first subjected to a differencing process which produces a difference image of positive and negative symbols (pixel values) in an alphabet of 2N+1 symbols of which the most frequently occurring symbol is the zero symbol. The zero symbol is mapped to the shortest codeword. The K most frequently occurring positive symbols are mapped to a set of K codewords, and the K most frequently occurring negative symbols are mapped to another set of K codewords. The length of each codeword is an inverse function of the frequency of occurrence of the corresponding symbol in the image and the longest codeword is of length d bits. The remaining N−K positive symbols and N-K negative symbols are mapped in order of their magnitudes to respective sets of supplementary codewords of a uniform maximum length D bits. The d most significant bits of each supplementary codeword form a prefix which is uniform within each set and specifies whether the corresponding symbol is positive or negative. The remaining or least significant D−d bits of each supplementary codeword comprise a suffix and are mapped in order of bit position to progressively more narrow ranges of symbol values of the remaining N−K positive symbols and the N−K negative symbols. Each bit thereof is mapped to a value obtained by interpolating between the maximum and minimum symbol values spanning the corresponding range The least significant bit (the $D^{th}$ bit) of the suffix specifies the exact symbol value. In the preferred embodiment, the prefix specifies the sign while the suffix specifies an absolute value.

One advantage of the invention is that the decoder can ignore any number or all of the bits of the suffix of each supplementary codeword. Thus, the number or variety of decoder designs is equal to the number (D−d) of bits in the suffix of the supplementary codewords. Accordingly, the invention provides far more flexibility in selecting bit resolution and complexity in the decoder.

As one example, a decoder of the simplest or most economical design would ignore all D−d bits of the suffix of any supplementary codeword. Such a decoder would map the prefix of the positively-prefixed supplementary codewords to a value computed by selecting a value between the maximum and minimum of the N−K least frequently occurring positive symbols. Similarly, it would map the prefix of the negatively-prefixed supplementary codewords to a value computed by selecting a value between the maximum and minimum of the N−K least frequently occurring negative symbols.

Another advantage of the invention is that it automatically provides for discriminating between positive and negative symbols using a single code table.

MODES FOR CARRYING OUT THE INVENTION

Figure 4:
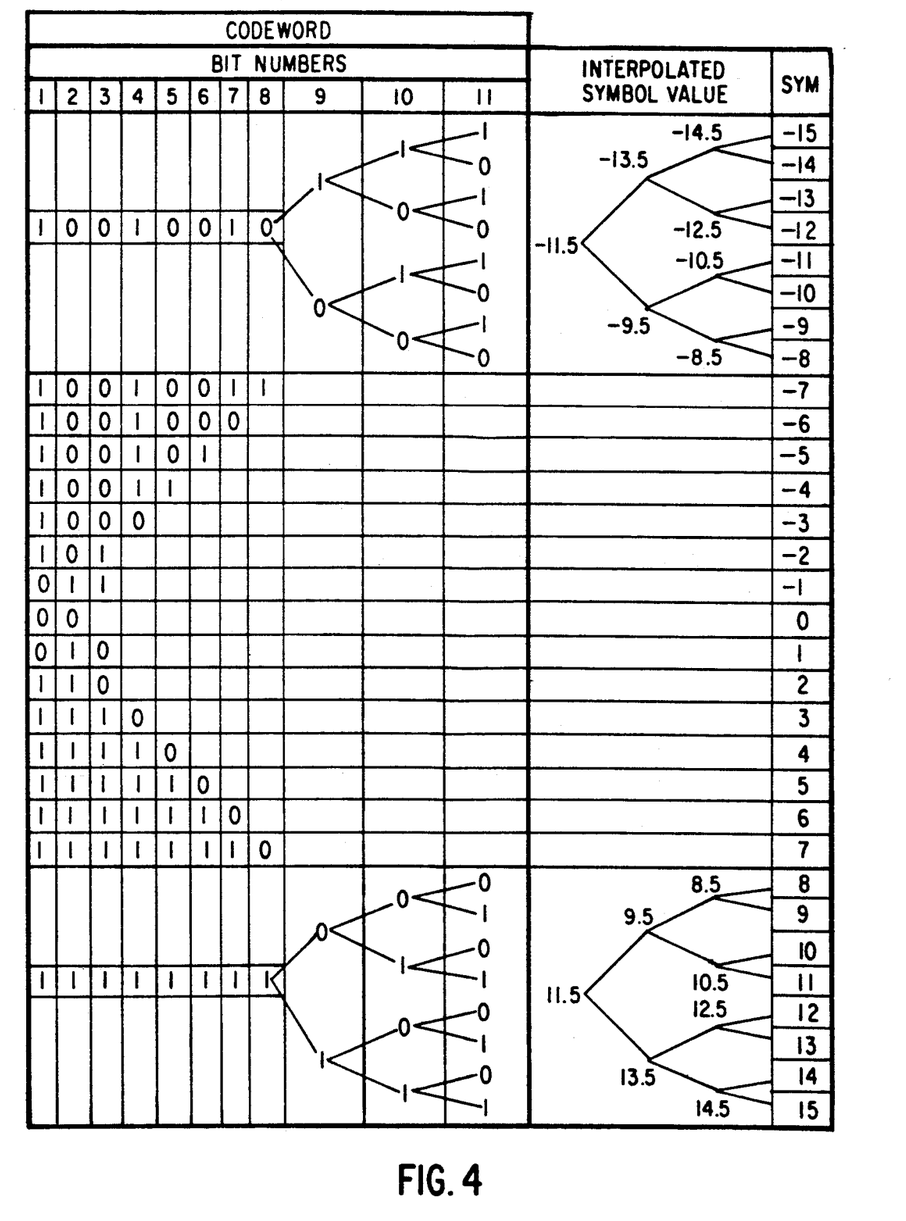
FIG. 4 is a diagram illustrating the structure of an exemplary code table of the present invention.

FIG. 4 illustrates one example of a code table embodying one aspect of the invention. In this example, the digital image to be encoded has been quantized and subjected to a differencing process to produce a difference image. The difference image consists of pixel values or symbols in a symbol alphabet having sixteen positive symbols (0 through 15) and fifteen negative symbols (−1 through −15). Thus, each pixel would be represented by a symbol comprising four bits and a sign bit. Because images typically contain may repetitive pixels (e.g., blue sky), the most frequently occurring symbol is 0. The eight most frequently occurring positive symbols are labelled (in the "SYMBOL" column of FIG. 4) 0 through 7 in order of their frequency of occurrence in the image (not necessarily in order of value) and are mapped in the diagram of FIG. 4 to eight codewords of increasing codeword length (i.e., 00 through 11111110). Similarly, the seven most frequently occurring negative symbols are labelled −1 through −7 in order of their frequency of occurrence and are mapped in the diagram of FIG. 4 to seven codewords of increasing length (i.e., 011 through 10010011).

The remaining (least frequently occurring) eight positive symbols are arranged in the SYMBOL column of FIG. 4 in order of increasing value 8 through 15. The codewords for each of these symbols are of the same uniform length (eleven bits) and all begin with the same 8-bit prefix (i.e., 11111111). This prefix specifies a positive symbol in the range of values 8 through 15. In a decoder of the invention which reads at most only the eight most significant bits of any codeword, this prefix is mapped to a symbol value obtained by interpolating between the maximum and minimum values (15 and 8) of the corresponding range, namely 11.5, as indicated in the diagram of FIG. 4. Such a decoder performs as if the code had a maximum codeword length of eight bits.

Similarly, the 8-bit prefix 10010010 of the codewords for the eight remaining (least frequently occurring) negative symbols is mapped to the interpolated symbol value −11.5.

In the example of FIG. 4, the suffix consists of 3 bits, namely the ninth, tenth and eleventh most significant bits of the codeword. For a decoder of the invention which reads no more than the nine most significant bits of any codeword, the ninth most significant bit specifies which half of the total range of values 8 through 15 the symbol belongs. Thus, FIG. 4 shows that if the ninth most significant bit is 1, then the codeword is mapped to a value obtained by selecting a value between the maximum and minimum symbol values in the highest half of the range (i.e., 15 and 11), or 13.5. If the ninth bit is zero, the mapped value is obtained by selecting a value between 11 and 8, or 9.5. For negative symbols, the selected values are −13.5 and −9.5, respectively. The decoder thus maps the appropriate nine bit codeword pattern to the corresponding selected symbol value. Such a decoder performs as if the maximum codeword length of the code were nine bits.

The tenth most significant bit indicates within the half of the range specified by the ninth most significant bit which quarter of the range the symbol belongs. For a decoder of the invention which reads no more than the ten most significant bits of any codeword, if the ninth most significant bit is 1 (specifying the upper half of the range between 8 and 15), then a tenth most significant bit of 1 or 0 specifies that the symbol lies in the range including 14 through 15 or 12 through 13, respectively, corresponding to selected values of 14.5 or 12.5, respectively. For negative symbols, the selected values are −14.5 or −12.5, respectively. Similarly, if the ninth most significant bit is 0, then a tenth most significant bit of 1 1 or 0 specifies that the symbol lies in the range including 10 through 11 or 8 through 9, respectively, corresponding to selected values of 10.5 or 8.5, respectively. For negative symbols, the selected values are −10.5 or −8.5, respectively. The decoder maps the appropriate ten bit codeword pattern to the corresponding selected symbol value. Such a decoder performs as if the maximum codeword length of the code were ten bits.

In the example of FIG. 4, the last bit of the suffix (the eleventh most significant codeword bit) maps directly to the exact symbol value, as indicated in the drawing. Thus, a decoder of the invention which reads as many as eleven most significant bits of any codeword provides the maximum resolution and quality.

Of course, it should be apparent from the foregoing that the skilled worker can implement many variations of the theme exemplified by the embodiment of FIG. 4. For example, the number of bits in the suffix may be increased, thereby increasing the number of symbols which may be encoded and increasing the number of possible decoder designs accordingly.

Figure 5:
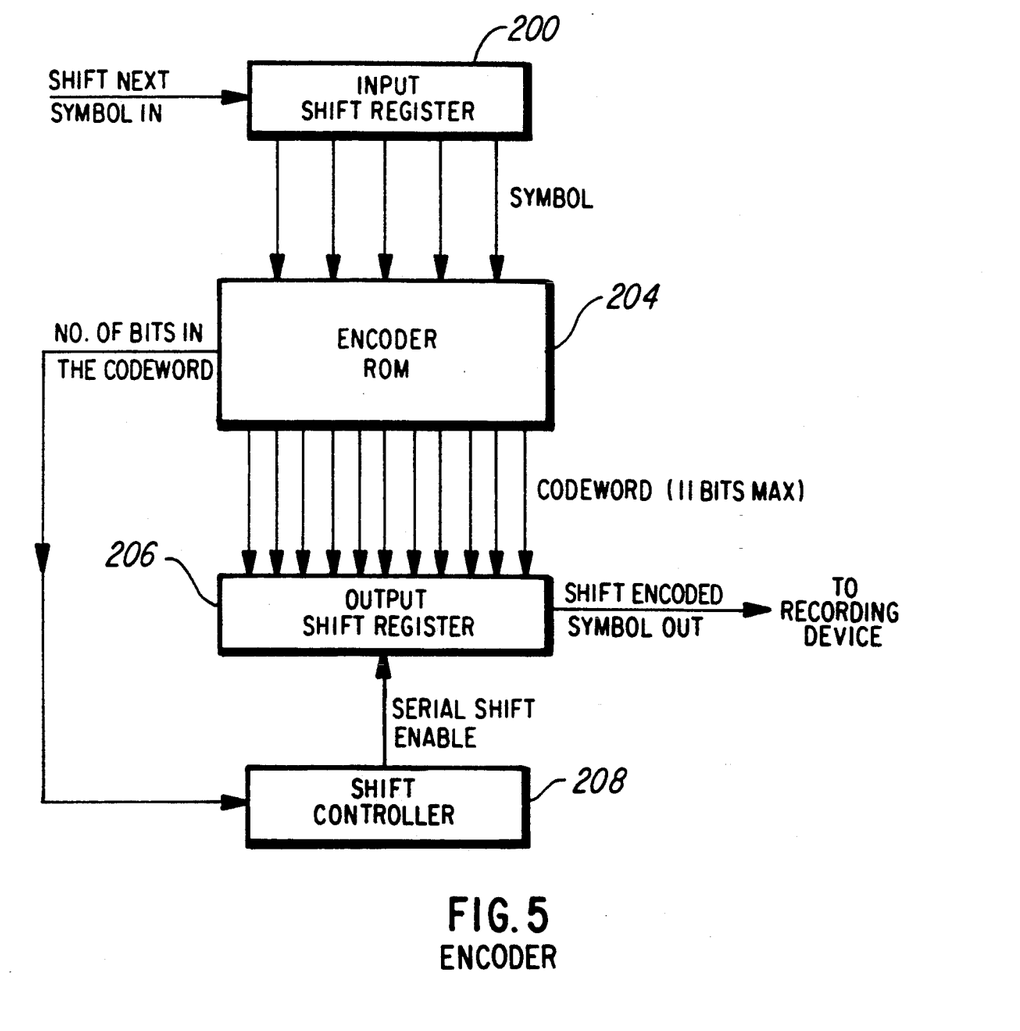
FIG. 5 is a block diagram illustrating an encoder embodying one aspect of the invention.

FIG. 5 illustrates an implementation of the encoder of the invention. The bits representing the incoming symbols are serially shifted symbol by symbol into a shift register 200. An encoder read only memory (ROM) 204 stores a look-up table mapping each symbol to a corresponding codeword (in accordance with the diagram of FIG. 4, for example). The ROM 204 responds to the symbol received from the parallel outputs of the register 200 by outputting a codeword to the parallel inputs of an output shift register 206. The ROM 204 also outputs the number of bits in the codeword to a shift controller 208. The shift controller 208 causes the output shift register 206 to shift a number of bits out of its serial output equal to the number of bits in the codeword. The data shifted out are transmitted to a recording device.

Figure 6:
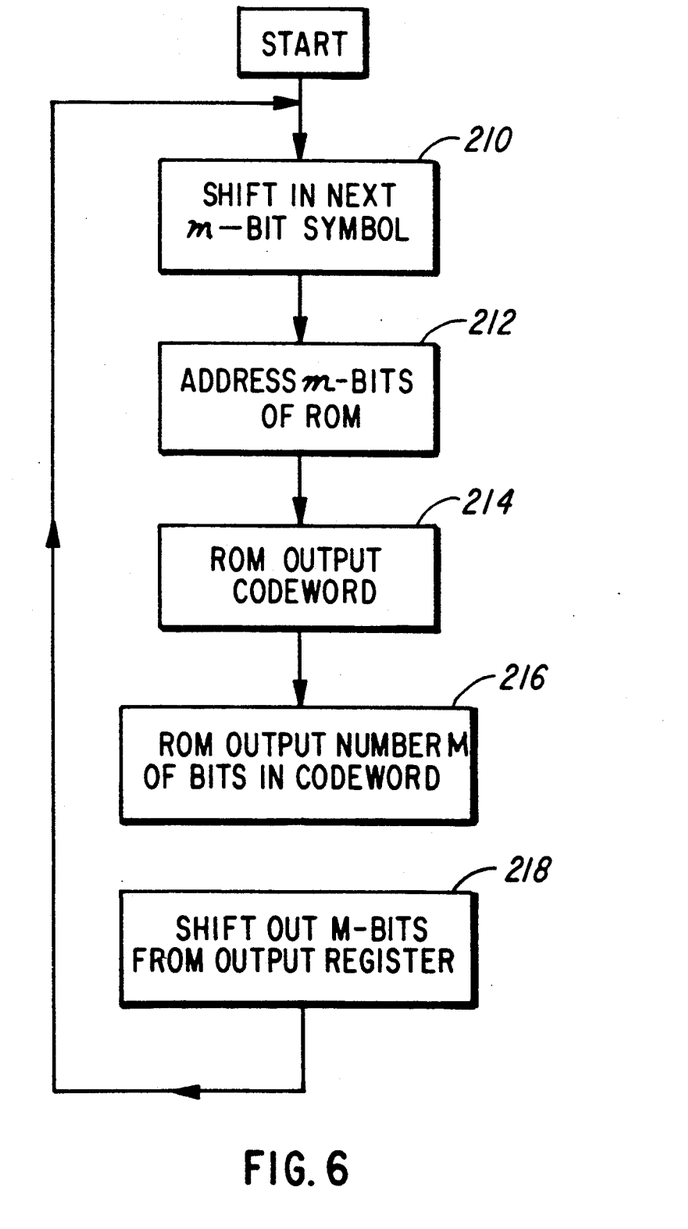
FIG. 6 illustrates the encoding process carried out by the encoder of FIG. 5.

This encoding operation is illustrated in FIG. 6. The first step (block 210 of FIG. 6) is to shift in m bits of data into the shift register 200, where m is the number of bits per symbol. In the example of FIG. 4, m=5. The next step (block 212) is to apply these bits to the address input of the ROM 204. Then, the ROM 204 outputs the corresponding codeword (block 214) to the output shift register 206 and outputs the number of bits in the codeword (block 216) to the shift controller 208. The shift controller 208 then causes the shift register to shift out the bits in the codeword (block 218 of FIG. 6).

Figure 7:
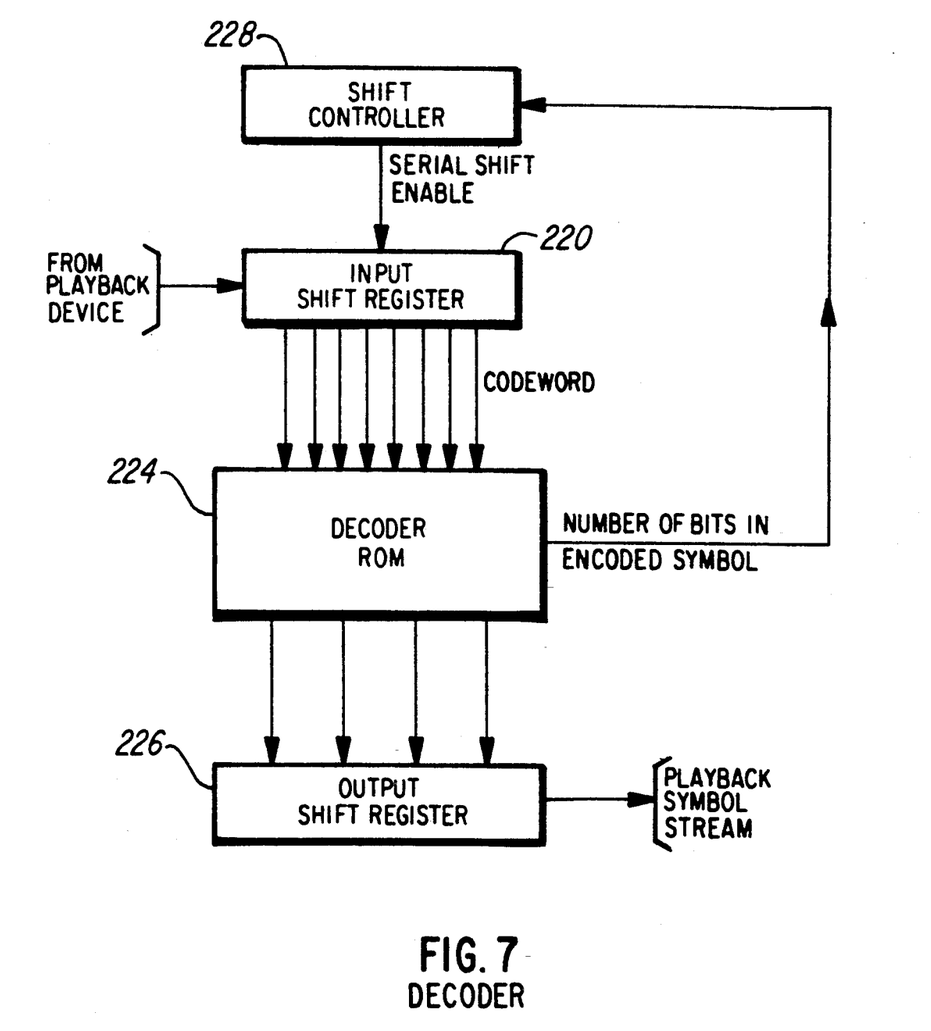
FIG. 7 is a block diagram illustrating a decoder embodying another aspect of the invention.

FIG. 7 illustrates one embodiment of a decoder of the invention. Data from a playback device are serially clocked into an input shift register 220. The length of the input shift register 220 determines the number of bits in a codeword which the decoder can read. The contents of the input shift register 220 are applied in parallel to the address input of a decoder ROM 224. The decoder ROM 224 stores a look-up table embodying at least a part of the code illustrated in the diagram of FIG. 4. It maps the codeword stored in the input shift register 220 to the corresponding symbol and outputs the symbol to the parallel input of an output shift register 226. The ROM 224 also outputs the number of bits in the codeword to a shift controller 228. The shift controller 228 shifts a number of bits into the serial input of the input shift register 220 equal to the number of bits in the previous codeword.

Figure 8:
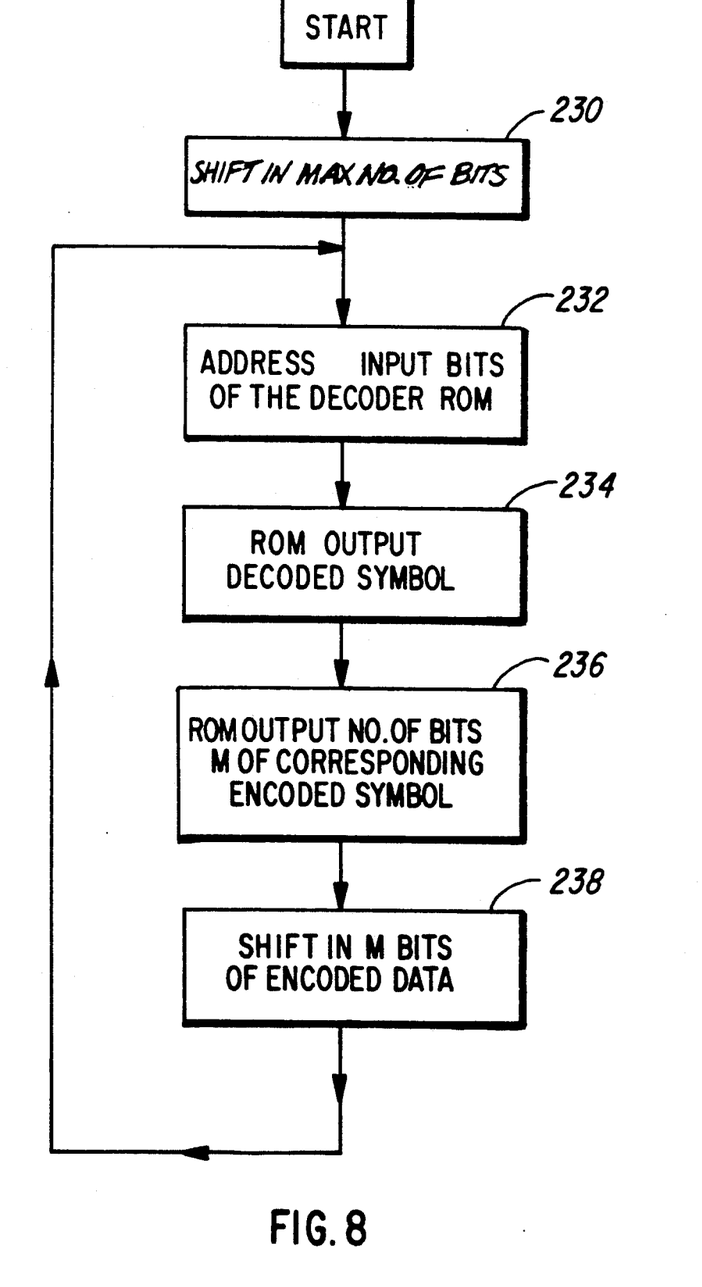
FIG. 8 illustrates the decoding process carried out by the decoder of FIG. 7.

The decoding process performed by the decoder of FIG. 7 is illustrated in FIG. 8. The decoder is initialized in block 230 of FIG. 8 by filling the input shift register 220 with the first M bits of the encoded data (where the shift register is M bits long). The contents of the input register 220 is applied through its parallel output to the address input of the decoder ROM 224 (block 232 of FIG. 8). The codeword may comprise as few as the two first received or most significant bits of the M bits in the input shift register 220. The decoder ROM 224 responds to the codeword bits by outputting the corresponding symbol to the output shift register 226, ignoring the remaining (last received or least significant) bits in the input register 220 (block 234 of FIG. 8). The decoder ROM 224 also outputs the number of bits in the codeword to the shift controller 228 (block 236 of FIG. 8). The shift controller causes this number of bits of encoded data to be shifted into the serial input of the input shift register 220 (block 238 of FIG. 8). The process then repeats beginning with the step of block 232.

The decoder design may be varied by changing the length (number of bits) of the input shift register 220. It should be at least as long as the two codeword prefixes of the supplementary codewords and need be no longer than the supplementary codeword length. In the example of FIG. 4, the shift register may be as short as eight bits and need be no longer than eleven bits. The length of the input shift register 220 determines the maximum codeword length which the decoder will read. The decoder input shift register in this example can have length 8, 9, 10 or 11 bits.

With each of these variations, the decoder table changes. For example, in a decoder which reads a maximum codeword length of 8 bits, the decoder ROM 224 stores a look-up table corresponding to the eight most significant bits (bits 1 through 8) of the diagram of FIG. 4. If it is to read maximum codeword length of 9 bits, the look-up table corresponds to the nine most significant bits (bits 1 through 9) of the diagram of FIG. 4, and so forth. In the latter embodiment, the look-up table maps the ninth bit to the appropriate interpolated symbol value, in accordance with the diagram of FIG. 4.

Referring to the process of FIG. 2, the encoder of FIG. 5 is employed in carrying out the encoding steps 116 and 116'. Referring to the process of FIG. 3, the 4 Base residual image contains proportionately more important information than the 16 Base residual image. Therefore, the decoding step 118 of the 4 Base residual image is more critical than the decoding step 118' for the 16 Base residual image. Accordingly, it may be desireable to employ decoders of the type illustrated in FIG. 5 with the input register 220 of a maximum length for carrying out the decoding step 118 for the 4 Base residual image and with the input register 220 of a shorter length for carrying out the decoding step 118' for the 16 Base residual image.

While the invention has been described in detail by specific reference to preferred embodiments thereof, it should be understood that other variations and modifications thereof may be made without departing from the true spirit and scope of the invention.

What is claimed is:

1. A method of processing an image, said method comprising a set of encoding steps comprising:
   quantizing said image to produce a digital image therefrom of symbols representing pixel values in an alphabet of N symbols characterized by different frequencies of occurrence in said digital image;
   first mapping K most frequently occurring symbols in said difference image to corresponding ones of a set of K codewords, wherein a length of each codeword is an inverse function of a frequency of occurrence of a corresponding symbol in the digital image and a longest codeword is of length d bits;
   second mapping each of the $n=K$ remaining symbols in said digital image in order of their magnitudes to a first set of $N-K$ supplementary codewords of a uniform maximum length D bits, wherein:
   (a) d most significant bits of each supplementary codeword is a first prefix which is uniform within each set,
   (b) $D-d$ least significant bits of each supplementary codeword correspond in order of bit position to progressively more narrow ranges of symbol values of the $N-K$ remaining symbols, wherein K, N, D and d are integers.

2. The method of claim 1 further comprising a transforming step carried out prior to said first mapping, whereby said alphabet of symbols further comprises a zero symbol and N negative symbols for a total of $2N+1$ symbols, of which a most frequently occurring symbol in said digital image is said zero symbol, wherein:
   said method further comprising mapping said zero symbol to a shortest codeword;
   said first mapping further comprises mapping each one of K most frequently occurring negative symbols in said digital image to a corresponding one of another set of K codewords;
   said second mapping further comprises mapping each of $N-K$ remaining negative symbols in said digital image in order of their magnitudes to a second set of $N-K$ supplementary codewords of a uniform maximum length D bits, wherein:
   (a) d most significant bits of each supplementary codeword is a second prefix which is uniform within each set and specifies that a corresponding symbol value is negative,
   (b) $D-d$ least significant bits of each supplementary codeword correspond in order of bit position to progressively more narrow ranges of symbol values of the $N-K$ remaining negative symbols.

3. The method of claim 1 wherein the second mapping step comprises mapping each of said $D-d$ least significant bits of a supplementary codeword to a value obtained by selecting a value between maximum and minimum symbol values spanning a corresponding range.

4. The method of claim 1 wherein a least significant bit of each supplementary codeword specifies an exact symbol value.

5. The method of claim 2 wherein the prefix specifies a sign while the $D-d$ least significant bits specify an absolute value.

6. The method of claim 1 further comprising a set of decoding steps comprising:
   receiving a next one of said codewords and sensing whether said codeword contains a prefix;
   for a codeword not containing a prefix, outputting a corresponding one of said symbols; and
   for a codeword containing a prefix, masking M least significant bits thereof, wherein $M \leq D-d$, and outputting a value corresponding to the $D-d$ least significant bits which have not bee masked.

7. The method of claim 2 further comprising a set of decoding steps comprising:
   receiving a next one of said codewords and sensing whether said codeword contains a prefix;

for a codeword not containing a prefix, outputting a corresponding one of said symbols including a sign bit; and for a codeword containing a prefix, masking M least significant bits thereof, wherein $M \leq D-d$, outputting a sign bit corresponding to said prefix and outputting a value corresponding to $D-d$ least significant bits which have not been masked.

8. The method of claim wherein $M=D-d$, whereby said value corresponding to said $D-d$ least significant bits corresponds to a selected value between the maximum and minimum ones of the corresponding said $N-K$ remaining symbols.

9. The method of claim 6 wherein $M=0$, whereby said value corresponding to said $D-d$ least significant bits equals an exact symbol value of a corresponding one of said symbols.

10. The method of claim 7 wherein said digital image separately comprises, respectively, a low resolution base image, a medium resolution residual image and a high resolution residual image, wherein a medium resolution version of said digital image is obtainable by combining an interpolated version of said base image with said medium resolution residual image, and a high resolution version of said digital image is obtainable by combining an interpolated version of said medium resolution version of said digital image with said high resolution residual image, wherein said masking step comprises varying M whereby to mask a different number of bits for respective ones of said low resolution base image, said medium resolution residual image and said high resolution residual image.

11. The method of claim 10 wherein said masking is characterized in that a lesser number of bits are masked when decoding said medium resolution residual image and a greater number of bits are masked when decoding said high resolution residual image.

12. A method of decoding an image which has been encoded by a set of encoding steps comprising (a) quantizing said image to produce to digital image therefrom of symbols representing pixel values in an alphabet of N symbols characterized by different frequencies of occurrence in said digital image, (b) first mapping each of K most frequently occurring symbols in said difference image to a corresponding one of a set of K codewords, wherein a length of each codeword is an inverse function of a frequency of occurrence of the corresponding symbol in the digital image and a longest codeword is of length d bits (c) second mapping each of $N-K$ remaining symbols in said digital image in order of their magnitudes to a first set of $N-K$ supplementary codewords of a uniform maximum length D bits, wherein (c1) d most significant bits of each supplementary codeword is a first prefix which is uniform within each set of (c2) $D-d$ least significant bits of each supplementary codeword correspond in order of bit position to progressively more narrow ranges of symbol values of the $N-K$ remaining symbols, said decoding method comprising:

receiving a next one of said codewords and sensing whether said codeword contains a prefix;

for a codeword not containing a prefix, outputting a corresponding one of said symbols; and for a codeword containing a prefix, masking M least significant bits thereof, wherein $M \leq D-d$, and outputting a value corresponding to $D-d$ least significant bits which have not been masked, wherein N, K, D and d are integers.

13. The method of claim 12 wherein said set of encoding steps further comprises a transforming step carried out prior to said first mapping, whereby said alphabet of symbols further comprises a zero symbol and N negative symbols for a total of $2N+1$ symbols, of which a most frequently occurring symbol in said digital image is said zero symbol, wherein (d) said method further comprising mapping said zero symbol to a shortest codeword, (e) said first mapping further comprises mapping each one of K most frequently occurring negative symbols in said digital image to a corresponding one of another set of K codewords and (f) said second mapping further comprises mapping each of $N-K$ remaining negative symbols in said digital image in order of their magnitudes to a second set of $N-K$ supplementary codewords of a uniform maximum length D bits, wherein (f1) d most significant bits of each supplementary codeword is a second prefix which is uniform within each set and specifies that a corresponding symbol value is negative, and (f2) $D-d$ least significant bits of each supplementary codeword correspond in order of bit position to progressively more narrow ranges of symbol values of $N-K$ remaining negative symbols, said decoding method further characterized in that:

the outputting the corresponding symbol includes outputting a sign bit;

the outputting a value corresponding to the $D-d$ least significant bits is accompanied by a step of outputting a sign bit corresponding to said prefix.

14. The method of claim 12 wherein the outputting a value corresponding to the $D-d$ least significant bits comprises mapping said $D-d$ least significant bits to a value obtained by selecting a value between maximum and minimum symbol values spanning a corresponding range.

15. The method of claim 12 wherein $M=0$, whereby said value corresponding to said $D-d$ least significant bits equals an exact symbol value of a corresponding one of said symbols.

16. Apparatus for encoding an image, comprising:

means or quantizing said image to produce a digital image therefrom of symbols representing pixel values in an alphabet of N symbols characterized by different frequencies of occurrence in said digital image;

a look-up table comprising:

first means for mapping K most frequently occurring symbols in said difference image to corresponding ones of a set of K codewords, wherein a length of each codeword is an inverse function of a frequency of occurrence of a corresponding symbol in the digital image and a longest codeword is of length d bits;

second means for mapping $N-K$ remaining symbols in said digital image in order of their magnitudes to a first set of $N-K$ supplementary codewords of a uniform maximum length D bits, wherein:

(a) d most significant bits of each supplementary codeword is a first prefix which is uniform within each set, (b) $D-d$ least significant bits of each supplementary codeword correspond in order of bit position to progressively more narrow ranges of symbol values of the $N-K$ remaining symbols;

input register means for receiving bits representing successive ones of said symbols of said digital image and means for addressing said look-up table with said bits;

output register means or receiving from said look-up table bits representing said codewords, for sensing from said look-up table a length of a current codeword and for shifting out a number of bits equal to said length, wherein K, N, D and d are integers.

17. The apparatus of claim 16 further comprising differencing means connected to said quantizing means, whereby said alphabet of symbols further comprises a zero symbol and N negative symbols for a total of $2N+1$ symbols, of which a most frequently occurring symbol in said digital image is said zero symbol, wherein:

said look-up table further comprises means for mapping said zero symbol to a shortest codeword;

said first mapping means further comprises means for mapping each one of K most frequently occurring negative symbols in said digital image to a corresponding one of another set of K codewords;

said second mapping mans further comprises means for mapping each of $N-K$ remaining negative symbols in said digital image in order of their magnitudes to a second set of $N-K$ supplementary codewords of a uniform maximum length D bits, wherein:

(a) d most significant bits of each supplementary codeword of said second set is a second prefix which is uniform within each set and specifies that a corresponding symbol value is negative, (b) $D-d$ least significant bits of each supplementary codeword of said second set correspond in order of bit position to progressively more narrow ranges of symbol values of $N-K$ remaining negative symbols.

18. Apparatus for decoding an image which has been previously encoded by (a) quantizing said image to produce a digital image therefrom of symbols representing pixel values in an alphabet of N symbols characterized by different frequencies of occurrence in said digital image, (b) first mapping each of K most frequently occurring symbols in said difference image to a corresponding one of a set of K codewords, wherein a length of each codeword is an inverse function of a frequency of occurrence of a corresponding symbol in the digital image and a longest codeword is of length d bits, (c) second mapping each of $N-K$ remaining symbols in said digital image in order of their magnitudes to a first set of $N-K$ supplementary codewords of a uniform maximum length D bits, wherein (c1) d most significant bits of each supplementary codeword is a first prefix which is uniform within each set and (c2) $D-d$ least significant bits of each supplementary codeword correspond in order of bit position to progressively more narrow ranges of symbol values of the $N-K$ remaining symbols, said apparatus comprising:

means for receiving a next one of said codewords and sensing whether said codeword contains a prefix;

look-up table means comprising:

means responsive to a codeword not containing a prefix, for outputting a corresponding one of said symbols, and means responsive to a codeword containing a prefix, for masking M least significant bits thereof, wherein $M \leq D-d$, and outputting a value corresponding to $D-d$ least significant bits which have not been masked, wherein N, K, D and d are integers.

19. The apparatus of claim 18 wherein said image has been further encoded by (d) transforming said image prior to said first mapping, whereby said alphabet of symbols further comprises a zero symbol and N negative symbols for a total of $2N+1$ symbols, of which a most frequently occurring symbol in said digital image is said zero symbol, (e) mapping said zero symbol to a shortest codeword, (f) mapping each one of K most frequently occurring negative symbols in said digital image to a corresponding one of another set of K codewords and (g) mapping each of remaining $N-K$ negative symbols in said digital image in order of their magnitudes to a second set of $N-K$ supplementary codewords of a uniform maximum length D bits, wherein (g1) d most significant bits of each supplementary codeword si a second prefix which is uniform within each set and specifies that a corresponding symbol value is negative, and (g2) $D-d$ least significant bits of each supplementary codeword correspond in order of bit position to progressively more narrow ranges of symbol values of the $N-K$ remaining negative symbols, said apparatus further characterized in that:

said means for outputting the corresponding symbol outputs a sign bit;

said means for outputting a value corresponding to the $D-d$ least significant bits further comprises means for outputting a sign bit corresponding to said prefix.

20. The apparatus of claim 18 wherein said means for outputting a value corresponding to the $D-d$ least significant bits comprises means for mapping said $D-d$ least significant bits to a value obtained by selecting a value between maximum and minimum symbol values spanning a corresponding range.

* * * * *

UNITED STATES PATENT AND TRADEMARK OFFICE
CERTIFICATE OF CORRECTION

PATENT NO. : 5,227,789
DATED : July 13, 1993
INVENTOR(S) : Michael J. Barry, et al It is certified that error appears in the above-indentified patent and that said Letters Patent is hereby corrected as shown below:

```
Column 8, line 3, "n=K" should read --N-K--.

Column 8, Claim 6, line 64, "bee" should read
--been--.

Column 10, Claim 16, line 2, "or" should read
--for--

Column 12, Claim 19, line 16, "si" should read
--is--.
```

Signed and Sealed this

Eighth Day of November, 1994

Attest:

BRUCE LEHMAN

*Attesting Officer*  *Commissioner of Patents and Trademarks*